A. BENNET & T. H. REID.
ROLLER BLIND.
APPLICATION FILED AUG. 3, 1917.
1,257,668.
Patented Feb. 26, 1918.
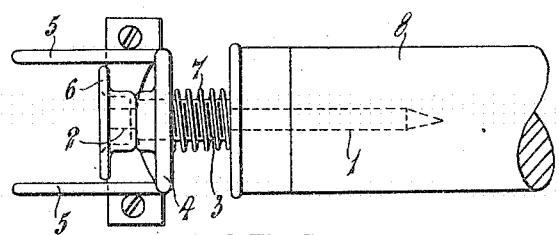
FIG. 1.
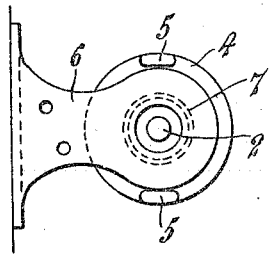
FIG. 2.
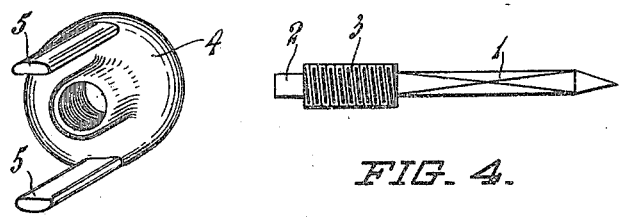
FIG. 3.
FIG. 4.
Inventors
Archibald Bennet
Thomas H. Reid
by W. S. Babcock
atty

UNITED STATES PATENT OFFICE.

ARCHIBALD BENNET, OF DUNEDIN, AND THOMAS HUGH REID, OF SOUTH DUNEDIN, NEW ZEALAND.

ROLLER-BLIND.

1,257,668.  Specification of Letters Patent.  Patented Feb. 26, 1918.

Application filed August 3, 1917. Serial No. 184,245.

*To all whom it may concern:*

Be it known that we, ARCHIBALD BENNET and THOMAS HUGH REID, citizens of the Dominion of New Zealand, and residing at 63 Arthur street, Dunedin, and 515 Cargill road, South Dunedin, respectively, both in the Provincial District of Otago, in the Dominion of New Zealand, have invented certain new and useful Improvements in Roller-Blinds, of which the following is a specification.

This invention relates to roller blinds and the object of the invention is to prevent roller blinds from over-running when suddenly released.

It is well known to users of roller blinds, that if a blind is suddenly released so that it has a free run, the free end of the blind will fly around the roller with the result that the blind and its roller must be taken down and readjusted to bring the spring again into proper operation for raising the blind.

This invention prevents such over-running and provides that the roller may be automatically brought to rest at any desired height.

The invention comprises an axle or pintle having a sided end which is driven into the dead end of the roller after the usual axle or pintle has been removed. By the dead end of the roller is meant the end remote from the end containing the usual operating spring.

The part of the axle or pintle projecting from the rollers has a circular journal which fits the usual supporting bracket of the roller, and between the said journal and the roller the axle or pintle has an increased diameter, which is screw threaded.

A nut having a horn or horns, adapted to be engaged by the supporting bracket, fits upon the screw threaded portion of the axle or pintle.

A spiral spring is located on the axle or pintle between the nut and the end of the roller.

The supporting bracket is taken down and removed outwardly to admit the slightly increased length of the axle or pintle. The spiral spring is placed on the axle or pintle, the nut is screwed for a short distance upon the axle or pintle, and the roller is placed in position on the supporting brackets with the horn or horns of the nut engaged by the supporting bracket as described.

In use, the nut is prevented from turning by its horn or horns engaging the supporting bracket, and when the blind is wound up the nut travels along the threaded portion of the axle or pintle and compresses the spiral spring until the blind is ultimately brought to rest. The position at which the blind is brought to rest is determined by the position to which the nut is screwed upon the axle before its horn or horns are placed in position on the supporting bracket. Also the strength of the spiral spring will be a determining factor in bringing the blind to rest at any required height.

When the blind is pulled down a reverse action takes place and the pressure of the spring is gradually reduced.

The drawing herewith illustrates the invention and will now be referred to for the purpose of a detailed description:—

Figure 1, is an elevation of part of a blind roller embodying the invention,

Fig. 2, is an elevation of a supporting bracket and the blind roller.

Fig. 3, is a perspective view of the nut, and

Fig. 4, is an elevation of the axle or pintle.

The axle or pintle has a sided end 1, a circular journal 2, and a part 3 between the end 1 and the journal 2, the said part being of larger diameter and screw threaded.

A nut 4 is screw threaded to fit upon the part 3, and has horns 5 adapted to be engaged by an ordinary blind roller supporting bracket 6.

A spiral spring 7 is located on the part 3 of the axle or pintle.

To apply the invention to a blind roller already in use, the supporting bracket is taken down and fixed in a fresh position farther outward to allow for the slightly increased length of the axle or pintle, which is driven into the dead end of the roller 8 with the part 3 and journal 2 projecting. The spiral spring is placed upon the part 3 and bears against the end of the roller and the nut 4, which is screwed for a short distance upon the axle or pintle. The roller is then placed in position on its supporting brackets with the journal 2 inserted in the bracket 6 and with the horns 5 engaged by the said bracket 6.

In use, the nut 4 is prevented from rotating by the bracket 6 engaging the horns 5, and when the blind is rolled up the rotation of the roller 8 causes the part 3 of the axle or pintle to screw into the nut 4, thereby compressing the spring between the said nut and the end of the roller, until the compression of the spring brings the roller to rest by friction.

When the blind is pulled down, the actions of the nut 4 and the spring 7 are reversed, and the compression of the spring is gradually reduced.

What we do claim and desire to secure by Letters Patent of the United States is:—

1. A blind roller having an axle part of which is screw threaded, a nut fitting the said part the said nut being prevented from rotating, and a spring adapted to be compressed between the said nut and the end of the roller when the winding up of the blind screws the said part into the nut, substantially as set forth.

2. In a blind roller as claimed in claim 1, a nut having horns engaged by a supporting bracket of the roller, substantially as set forth.

3. In a blind roller as claimed in claim 1, a spring adapted to be compressed for the purpose of bringing the blind to rest when being wound upon the roller, substantially as set forth.

4. A longitudinally movable blind roller provided with an axle attached thereto, sharing the longitudinal and rotary movement of said roller and having a screw-threaded part, a screw-threaded element engaging said part and held against rotation, and a spring arranged to be put under strain by the endwise movement of said roller and axle as the roller winds up, thereby resisting such winding.

5. A removable axle for a blind roller adapted to be driven into the end of the same and held to turn with said roller, said axle being provided with a screw-threaded part, in combination with a relatively fixed screw-threaded element engaging said part and a spring surrounding said part between it and the end of the roller when said axle is thus driven into the latter in order that the endwise movement of said roller may compress the spring and cause it to check such winding.

6. A longitudinally movable blind roller, in combination with screw-threaded engaging devices, detachable from said roller, for causing such motion, and a spring arranged to be put under strain by such longitudinal motion.

In testimony whereof we have signed our names to this specification in the presence of two witnesses.

ARCHIBALD BENNET.
THOMAS HUGH REID.

Witnesses:
SAMUEL PHILIP MIRAMS,
LILLEY LAMBERT BROWN.